United States Patent [19]

Tam et al.

[11] Patent Number: 4,541,548

[45] Date of Patent: Sep. 17, 1985

[54] DISPENSER WITH SNIFF DEVICE AND METHOD

[75] Inventors: Jimmy W. Tam, Shoreview; Gary W. Odegaard, Fridley; William C. Scherer, Minneapolis; Alan P. Lonneman, Coon Rapids, all of Minn.

[73] Assignee: Red Devil, Inc., Union, N.J.

[21] Appl. No.: 523,129

[22] Filed: Aug. 15, 1983

[51] Int. Cl.[4] .............................................. B67D 5/22
[52] U.S. Cl. .................................... 222/48; 222/1; 222/49; 222/109; 222/110; 222/386; 141/117; 604/900
[58] Field of Search .................... 222/42, 43, 48–50, 222/309, 108–110, 386, 387, 390; 73/864.18, 864.62; 141/116, 117; 604/900, 248, 236

[56] References Cited

U.S. PATENT DOCUMENTS

| | | | |
|---|---|---|---|
| 1,041,524 | 10/1912 | Snyder et al. | 222/390 |
| 1,288,554 | 12/1918 | France | 222/390 |
| 1,571,634 | 2/1926 | McSpadden | 222/390 |
| 2,103,817 | 12/1937 | Johnson . | |
| 2,107,987 | 2/1938 | Johnson . | |
| 2,412,295 | 12/1946 | Shaffer | 222/390 |
| 2,413,916 | 1/1947 | Hallead . | |
| 3,097,763 | 7/1963 | Aluotto | 222/43 |
| 3,343,539 | 9/1967 | Moorhouse | 222/309 |
| 3,747,812 | 7/1973 | Karman | 222/387 |
| 3,874,430 | 4/1975 | Lansdale | 141/116 |

FOREIGN PATENT DOCUMENTS 574925 1/1945 United Kingdom ............... 141/117

Primary Examiner—H. Grant Skaggs
Attorney, Agent, or Firm—Albert F. Kronman

[57] ABSTRACT

Apparatus for dispensing paint or other liquids having a rotational valve actuable between a dispensing position and a suction position and a piston and cylinder assembly in flow coupling relation to the valve, and having a base plate for rotationally positioning the piston and cylinder assembly between the dispensing position and the suction position, including an inclined plane for imparting a predetermined suction movement of the piston during the rotational positioning.

4 Claims, 5 Drawing Figures

U.S. Patent     Sep. 17, 1985     4,541,548
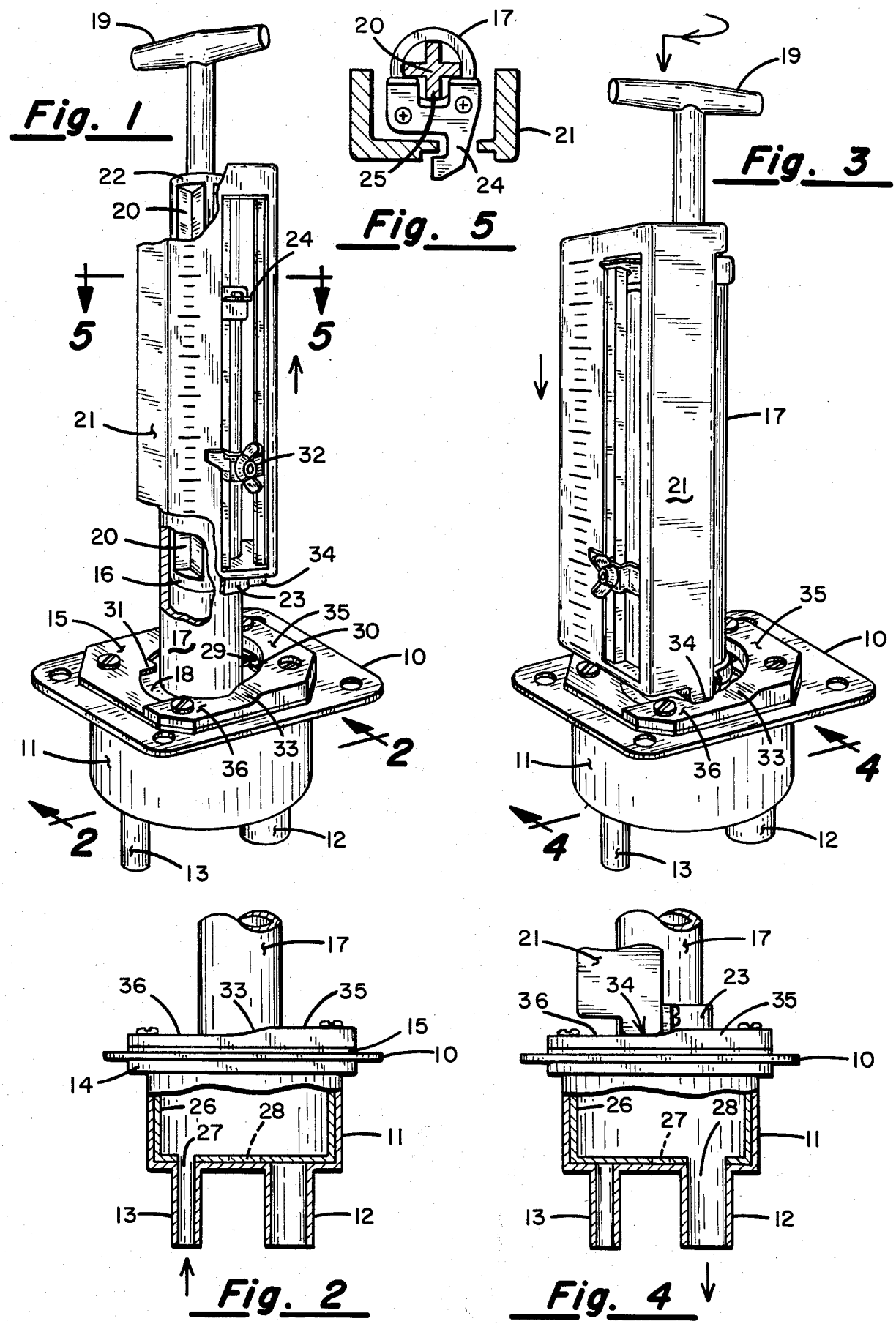

DISPENSER WITH SNIFF DEVICE AND METHOD

BACKGROUND OF THE INVENTION

This invention relates to a fluid dispensing apparatus and method, and more particularly to an apparatus and method for sniffing, that is, retracting residual fluid of dispensing back into a dispensing outlet.

A major problem in the dispensing of fluid materials, particularly non-gaseous flowable liquids of various viscosities, including even those approaching a pasty character, is that of avoiding the mess caused by drips from the dispensing outlet or nozzle. The problem is not alone confined to the mess caused by drips and the uncertainty of their occurrence. In many cases accurate proportioning of a dispensed quantity can be upset by extra drips or the failure of a drip to occur when the proportioning measurements call for that extra drip. This problem is particularly acute in the mixing and tinting of paints, especially where only a very small quantity of colorant material is to be added to a particular base material. The problem is, however, not limited to paint tinting and occurs whenever dispensing is to be accomplished with precision and without mess.

The problem is one of long standing. Illustratively, U.S. Pat. No. 2,103,817 issued Dec. 28, 1937 to B. E. Johnson provides a complex solution involving a multitude of arms and cams to create a suction effect for withdrawing residual dispensed fluid so as to avoid drips or stringing of material and causing a mess. U.S. Pat. No. 2,107,987 issued Feb. 8, 1938 to B. E. Johnson continues the approach of employing a multitude of arms and cams. A still further approach for solution to the problem is set forth in U.S. Pat. No. 2,413,916 issued Jan. 7, 1947 to M. Hallead, where the approach taken is to plug the dispensing outlet and also employ suction.

All known approaches for solution to the problem have presented the art with either a complex system of apparatus elements or with specially designed components which add substantial cost to the dispensing apparatus, particularly as compared to the solution provided by this invention.

The solution of this invention is particularly noteworthy when it is recognized that the basic dispensing apparatus illustrated in the drawings has been known for years as an entity apart from its combination with the special features forming the sniff device and the method of its operation according to this invention.

SUMMARY OF THE INVENTION

The present invention relates to an improved fluid dispensing apparatus and method for effecting the retraction of residual fluid of dispensing back into the dispensing outlet so as to reduce the possiblity of the residual fluid dripping from the outlet. The sniff device for accomplishing this is not complicated; is extremely economical, easily fabricated, and highly reliable and effective in operation.

The invention is that of combination of the new sniff device with fluid dispensing apparatus having certain features, namely, a base assembly including a dispensing outlet, an actuating assembly including a reciprocable element associated with the base assembly for a dispensing stroke toward the base assembly to effect dispensing of fluid through the dispensing outlet and a retractive stroke away from the base assembly, and an auxiliary assembly operably connected to the reciprocable element for reciprocating movement therewith. The auxiliary assembly is indexable between two different stations with respect to the base assembly. One station is called the primary station, that is, the station at which the dispensing stroke for the reciprocating element is completed.

This new sniff device consists essentially of an inclined plane member generally oriented transversely to the reciprocating movement of the reciprocating element with the incline of the plane being least at the primary station, plus an abutment member for sliding movement on the inclined plane member as the auxiliary assembly is indexed rotatably from the primary station. One of the members of the sniff device is on the base assembly of the dispensing apparatus and the other of the members of the sniff device is on the auxiliary assembly. The arrangement effects a slight retractive movement of the reciprocable element and consequent suction or sniff of residual fluid of dispensing back into the dispensing outlet as the auxiliary assembly is indexed rotatably from the primary station after the dispensing stroke of the reciprocable element.

The method of the invention involves controlling the dispensing of fluid through a dispensing outlet of a base assembly in a manner to reduce the possiblity of residual fluid dripping from the outlet after the dispensing stroke of a reciprocable element. The method comprises indexing rotatably into a primary station an auxiliary assembly operably connected to the reciprocable element for reciprocating movement therewith. The reciprocable element is then actuated toward the base assembly to effect the dispensing stroke of that element. Thereafter, the auxiliary assembly is indexed rotatably from the primary station over means effectively constituting an inclined plane. This action moves the auxiliary assembly away from the base assembly, which simultaneously effects a slight retractive stroke of the reciprocable element and a consequent sniff of residual fluid back into the dispensing outlet.

BRIEF DESCRIPTION OF THE DRAWINGS

FIG. 1 is a schematic perspective view of apparatus of the invention, with some parts broken away and others shown in cross section, and particularly shows the auxiliary assembly of the apparatus in an indexed position for intake of fluid to be dispensed;

FIG. 2 is a schematic side view of the lower portion of the apparatus of FIG. 1, with parts broken away and with the lowermost portion shown in a cross section taken along lines 2—2 of FIG. 1;

FIG. 3 is a schematic perspective view of the apparatus of FIG. 1, showing the auxiliary assembly in an indexed position called the primary station, which is the station at which dispensing of fluid is accomplished;

FIG. 4 is a side view of the lower portion of the apparatus of FIG. 1, with parts broken away and with the lowermost portion shown in a cross section taken along line 4—4 of FIG. 3; and FIG. 5 is a schematic plan view of the top of the piston chamber taken along line 5—5 of FIG. 1 and including a cross section through the piston rod.

DESCRIPTION OF THE PREFERRED EMBODIMENT

Referring to the drawing, particularly FIG. 1, the base assembly of the apparatus is illustrated as comprising a base plate or frame 10, a plenum housing 11, a dispensing outlet or nozzle 12, and an intake port or conduit 13. The plate 10 may suitably be provided with a body portion 14 for seating of screws or other fastening means for fixing a collar 15 onto it.

The actuating assembly includes the reciprocating element or piston 16 and chamber 17 for it. While the reciprocating element is illustrated as a cylindrical piston, any other suitable element or shape may be employed with a cooperating chamber for it. In the illustrated preferred embodiment, the piston chamber 17 is provided with a lower radially outward flange 18; and flange 18 is held under collar 15 so that the reciprocation action of the piston is toward and away from the base assembly. The actuating means for reciprocating the piston is illustrated as a handle 19 for effecting manual reciprocation. The handle 19 is connected to a piston rod 20, which is connected to piston 16. The piston chamber 17 is operably connected to the base assembly in a manner such that the dispensing stroke of the piston is toward the base assembly, whereas the retractive stroke of the piston is away from the base assembly and effectively causes a suction or intake action.

An auxiliary assembly 21 is operably connected to the piston rod 20 for reciprocating movement with piston 16. The auxiliary assembly may assume rather large proportions, as illustrated; or it may in the alternative comprise a very simple and small structure. The essential feature of the auxiliary assembly is simply that it must be connected operably to the piston in some way for reciprocating movement therewith. The auxiliary assembly 21 of the drawing comprises a slotted elongated member on one portion of which a scale for measurement is carried.

Another feature of the auxiliary assembly 21 is that it is indexable between two different stations with respect to the aforedescribed base assembly, that is, the aforedescribed elements 10 through 13. In the illustrated embodiment, a plenum valve 26, auxiliary assembly 21, and piston 16 and piston chamber 17 are all indexable rotatably between two different stations with respect to the base assembly; but for the most simple practice of the invention, it is only necessary that the plenum valve 26 be indexable with respect to the base assembly. The piston and piston chamber need not necessarily be indexable where the most simple practice of the invention is accomplished. In the drawing, the auxiliary assembly member 21 is fixed to piston rod 20 at a collar assembly 22 integral with rod 20 so that rotation of auxiliary assembly 21 takes place when the rod 20 is indexed rotatably. At the lower end of the main element of the auxiliary assembly a slidable collar 23 is employed to hold auxiliary assembly 21 about the piston chamber 17 and yet permit reciprocating movement of the auxiliary assembly with respect to the chamber.

Referring to FIGS. 1 and 5, the piston rod 20, at the portion below collar assembly 22, is provided with a cross sectional shape in the form of a cross. A stop member 24 is fixed on the top of the piston chamber 17. One arm 25 of the rod 20 projects into a recess of the stop member 24; and the recess is large enough to allow some rotary play movement of the rod 20 before the arm 25 abuts against sides of the recess and effectively causes a follower rotary movement of the entire piston chamber 17 as rod 20 is rotated. Thus, the piston chamber 17 is rotatably indexable between two different stations in the embodiment illustrated.

Operably connected to the piston chamber in a manner for indexing rotatably therewith is a plenum valve 26 located more or less as a lining within the plenum housing 11 of the base assembly. When the piston rod 20 (and piston 16, auxiliary assembly 21, piston chamber 17, and plenum valve 26) is indexed rotatably to the position illustrated in FIG. 1, the intake opening 27 of the plenum valve 26 is located in register with the intake port 13 of the plenum valve housing 11 (see FIG. 2); and a retractive movement of the piston 16 away from the base assembly plate 10 may be employed to effectively draw fluid to be dispensed through intake port 13 into the plenum chamber formed by valve 26 and also into the piston chamber 17.

Upon approximately 90° indexing of the plenum valve 26 to the position illustrated in FIG. 3, a wall of plenum valve 26 covers the intake port 13 and a discharge opening 28 of plenum valve 26 registers with the dispensing outlet 12 of the base assembly (see FIG. 4); and in this orientation or station, the dispensing stroke of the piston 16 toward the base assembly plate 10 serves to dispense fluid out the dispensing outlet 12. The limits of indexable rotation between stations about 90° apart may be governed by any suitable means; illustratively, the piston chamber may be provided with a radially outward flange or finger 29 above collar 18 and operable to abut against stops 30 and 31 of collar 15.

Referring to FIGS. 1 and 3, a brief description of means for measuring fluid to be dispensed will now be described. Within the slot of the auxiliary assembly 21 carrying the scale for measurement is located a measuring arm assembly 32 which is slidably adjustable along the slot and yet fixable in position by tightening a wing nut. This device is adjusted to the quantity one desires to dispense; for example, if 5 millimeters of a black pigment mixture is desired, the measuring assembly 32 is placed at the 5 millimeter level of the scale while the auxiliary assembly 21 is in the orientation shown in FIG. 1. The intake (retractive) movement or stroke of the piston away from the base assembly is stopped when the measuring assembly 32 abuts against the stop member 24 fixed on the outer end of the piston chamber, thus limiting the fluid intake to that desired to be dispensed.

The sniff device and its operation are best described by reference primarily to FIGS. 1 and 3. The device consists essentially of an inclined plane member 33 and an abutment member 34 for sliding movement on the inclined plane member. The inclined plane member 33 suitably is a semi-circular plate having an upper level 35 and a lower level 36, with an inclined plane section connecting the two levels. The inclined plane member is oriented substantially transversely to the reciprocating movement of piston 16. It is suitably fixed upon the base assembly plate 10, with the lowermost or least level of incline of the plane member being located at the station of indexing for the auxiliary assembly characterized as the primary station (see FIG. 3), that is, the station for dispensing. The abutment member 34 for sliding movement on the inclined plane member may consist of a part of the auxiliary assembly 21. Thus, the auxiliary assembly may be characterized as consisting of a means which exhibits more than one function, one being that of the abutment function for sliding on the inclined plane. The illustrated abutment member is but a part of the contour of the auxiliary assembly 21.

If desired, the inclined plane member may be affixed to the auxiliary assembly, or molded as part of it; and an abutment member for sliding movement over the inclined plane member may consist of a bulge or knob fixed to or consisting of a part of the base assembly (such as, for example, a part of plate 10 of the base assembly).

Briefly, in operation, after the dispensing stroke of the piston 16 is accomplished with the auxiliary assembly previously indexed to the primary station illustrated in FIG. 3, one then indexes the auxiliary assembly rotatably (a counter clockwise movement when FIG. 3 is viewed from the top) from that primary position or station. That action in turn slides the abutment member 34 of the auxiliary assembly up the inclined plane portion 33 of the inclined plane plate onto the upper level 35 of that inclined plane plate. To be recognized is that the inclined plane portion of the inclined plane member 33 is so oriented as to effectively cause the abutment member 34 on the auxiliary assembly to slightly elevate the auxiliary assembly and simultaneously retract the piston within piston chamber 17 at a time when the plenum valve outlet 28 and the dispensing outlet 12 are still in registration. The slight play between the arm 25 of the cross of the piston rod and the recess in stop member 24 (see FIG. 5) contributes to this result inasmuch as rotational movement of the plenum valve outlet does not occur on indexing from the primary station until the abutment member 34 starts up the inclined plane 33 or is about to start up that incline. However, the play of movement on rotary indexing may be omitted, and the incline of the plane slightly advanced so as to effectively cause retractive piston movement while some registration remains between the plenum valve discharge opening 28 and dispensing outlet 12 on indexing the auxiliary assembly away from the primary station; or the principles of the inclined plane action as described may be employed in other forms of apparatus lacking the plenum valve arrangement illustrated. The essential feature is that of the inclined plane effecting a small retractive movement of the piston or reciprocating element on rotary indexing so as to suck or retract residual or terminal fluid of dispensing back into the dispensing outlet or nozzle and thereby prevent that residual portion of the fluid from dropping or driping from the outlet.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

We claim:

1. In combination with a fluid dispensing apparatus having a base assembly including a dispensing outlet, an actuating assembly including a reciprocable element associated with said base assembly for a dispensing stroke toward said base assembly to effect dispensing through said outlet and a retractive suction stroke away from said base assembly, and an auxiliary assembly operably connected to said reciprocable element for reciprocating movement therewith, said auxiliary assembly being indexable rotatably between two different stations with respect to said base assembly, one said station being a primary station at which said dispensing stroke for said dispensing is effected, the improvement comprising a sniff device consisting essentially of an inclined plane member on said base generally oriented transversely to the reciprocating movement of said reciprocable element with the level of said inclined plane member being least at said primary station, and an abutment member for sliding movement on said inclined plane member as said auxiliary assembly is indexed rotatably from said primary station, one of said members being on said base assembly and the other of said members being on said auxiliary assembly, whereby a slight retractive movement of said reciprocable element and consequent sniff of residual fluid of dispensing back into said dispensing outlet is effected as said auxiliary assembly is indexed rotatably from said primary station after a said dispensing stroke.

2. The combination of claim 1, wherein said abutment member comprises a part of said auxiliary assembly.

3. In combination with a fluid dispensing apparatus having a base assembly including a dispensing outlet, an actuating assembly including a piston for reciprocating movement within a piston chamber operable connected to said base assembly for a dispensing stroke of said piston toward said base assembly to effect dispensing through said dispensing outlet and a retractive suction stroke of said piston away from said base assembly, and an auxiliary assembly operably connected to said piston for reciprocating movement therewith, said auxiliary assembly being indexably rotatable between two different stations with respect to said base assembly, one said station being a primary station for said dispensing stroke of said piston, the improvement comprising a sniff device for effecting the retraction of residual fluid of dispensing back into said dispensing outlet, said sniff device being operable as said auxiliary assembly is indexed from said primary station and consisting essentially of an inclined plane member generally oriented transversely to the reciprocating movement of said piston with the level of said inclined plane member being least at said primary station and an abutment member for sliding movement on said inclined plane member, one of said members being on said base assembly and the other of said members being on said auxiliary assembly.

4. The method of controlling the dispensing of fluid through a dispensing outlet of a base assembly in a manner to reduce the possiblity of residual fluid dripping from the outlet after the dispensing action effected by a dispensing stroke of a reciprocable element, comprising indexing rotatably into a primary station an auxiliary assembly operably connected to said reciprocable element for reciprocating movement therewith, actuating said reciprocable element toward the base assembly to thereby effect said dispensing stroke of said element, and indexing rotatably said auxiliary assembly from said primary station over means effectively constituting an incline which effects a slight retractive stroke of said reciprocable element and consequent sniff of residual fluid of dispensing back into said dispensing outlet.

* * * * *